(12) United States Patent
Oleskevich et al.

(10) Patent No.: US 8,400,407 B2
(45) Date of Patent: Mar. 19, 2013

(54) TOUCH PANEL AND INTERACTIVE INPUT SYSTEM INCORPORATING THE SAME

(75) Inventors: Tanya Oleskevich, Calgary (CA); Don Robertson, Calgary (CA); Nicole Martin, Calgary (CA)

(73) Assignee: SMART Technologies ULC (CA)

( * ) Notice: Subject to any disclaimer, the term of this patent is extended or adjusted under 35 U.S.C. 154(b) by 747 days.

(21) Appl. No.: 11/779,567

(22) Filed: Jul. 18, 2007

(65) Prior Publication Data
US 2009/0020342 A1    Jan. 22, 2009

(51) Int. Cl.
*G09G 5/00* (2006.01)
(52) U.S. Cl. ......... 345/173; 345/156; 345/903; 345/1.1; 178/18.01; 178/18.03; 361/728; 361/729; 361/732
(58) Field of Classification Search .................. 345/156, 345/173, 903, 1.1; 178/18.03, 18.01, 18.09, 178/18.11; 361/728, 729, 732, 748, 784; 349/73-74
See application file for complete search history.

(56) References Cited

U.S. PATENT DOCUMENTS

| | | | |
|---|---|---|---|
| 3,054,325 A | | 9/1962 | Crockwell |
| 4,144,449 A * | | 3/1979 | Funk et al. ..................... 250/221 |
| 4,828,502 A | | 5/1989 | Leahy |
| 5,400,178 A * | | 3/1995 | Yamada et al. ............... 359/449 |
| 5,515,900 A * | | 5/1996 | West et al. .................... 160/135 |
| 6,057,898 A * | | 5/2000 | Itoh et al. ........................ 349/73 |
| 6,072,476 A * | | 6/2000 | Harada et al. ................ 345/204 |
| 6,252,564 B1 * | | 6/2001 | Albert et al. ................... 345/1.3 |
| 6,340,957 B1 * | | 1/2002 | Adler et al. ..................... 345/1.3 |
| 6,377,228 B1 * | | 4/2002 | Jenkin et al. .................... 345/1.3 |
| 6,624,870 B1 | | 9/2003 | Greene et al. |
| 6,734,617 B2 * | | 5/2004 | Sundahl ......................... 313/493 |
| 7,030,855 B2 * | | 4/2006 | Metcalf ......................... 345/108 |
| 7,095,387 B2 * | | 8/2006 | Lee et al. ........................... 345/4 |
| 7,599,520 B2 * | | 10/2009 | Dempski et al. .............. 382/103 |
| 7,719,480 B2 * | | 5/2010 | Devos et al. .................... 345/1.3 |
| RE43,084 E * | | 1/2012 | Fujioka .......................... 345/175 |
| 8,289,299 B2 * | | 10/2012 | Newton ......................... 345/175 |
| 2002/0145595 A1 * | | 10/2002 | Satoh ............................ 345/173 |
| 2003/0071832 A1 * | | 4/2003 | Branson ........................ 345/698 |
| 2003/0129355 A1 * | | 7/2003 | Ross ................................ 428/98 |
| 2003/0160755 A1 * | | 8/2003 | Gettemy et al. .............. 345/156 |
| 2005/0020175 A1 * | | 1/2005 | Tamashiro et al. ............. 445/24 |
| 2005/0156900 A1 * | | 7/2005 | Hill et al. ....................... 345/173 |
| 2005/0178034 A1 * | | 8/2005 | Schubert et al. ................ 40/605 |

(Continued)

FOREIGN PATENT DOCUMENTS
EP    1550940 A2    12/2004

OTHER PUBLICATIONS

Transmittal; International Search Report; and Written Opinion of the International Searching Authority for International Application PCT/CA2008/001310.

(Continued)

*Primary Examiner* — Lun-Yi Lao
*Assistant Examiner* — Priyank Shah
(74) *Attorney, Agent, or Firm* — Katten Muchin Rosenman LLP

(57) ABSTRACT

A touch panel comprises a substrate having a forward major surface and formed of a plurality of assembled substrate segments. Cover material overlies the forward major surface to reduce the visibility of seams between adjacent substrate segments.

30 Claims, 4 Drawing Sheets

U.S. PATENT DOCUMENTS

| | | | |
|---|---|---|---|
| 2005/0243070 A1* | 11/2005 | Ung et al. | 345/176 |
| 2005/0259084 A1* | 11/2005 | Popovich et al. | 345/173 |
| 2006/0034486 A1* | 2/2006 | Morrison et al. | 382/103 |
| 2006/0125784 A1* | 6/2006 | Jang et al. | 345/156 |
| 2006/0244734 A1 | 11/2006 | Hill et al. | |
| 2007/0075982 A1* | 4/2007 | Morrison et al. | 345/173 |
| 2007/0144046 A1* | 6/2007 | Hardt, II | 40/605 |
| 2008/0068352 A1* | 3/2008 | Worthington et al. | 345/175 |
| 2009/0017313 A1* | 1/2009 | Outlaw et al. | 428/446 |

OTHER PUBLICATIONS

Supplementary European Search Report for European Patent Application No. 08 78 322 with a completion date of Aug. 26, 2011.

Jun. 9, 2011 Notification of First Office Action from the State Intellectual Property Office of the People's Republic of China for Chinese Patent Application No. 20080025054.6.

* cited by examiner

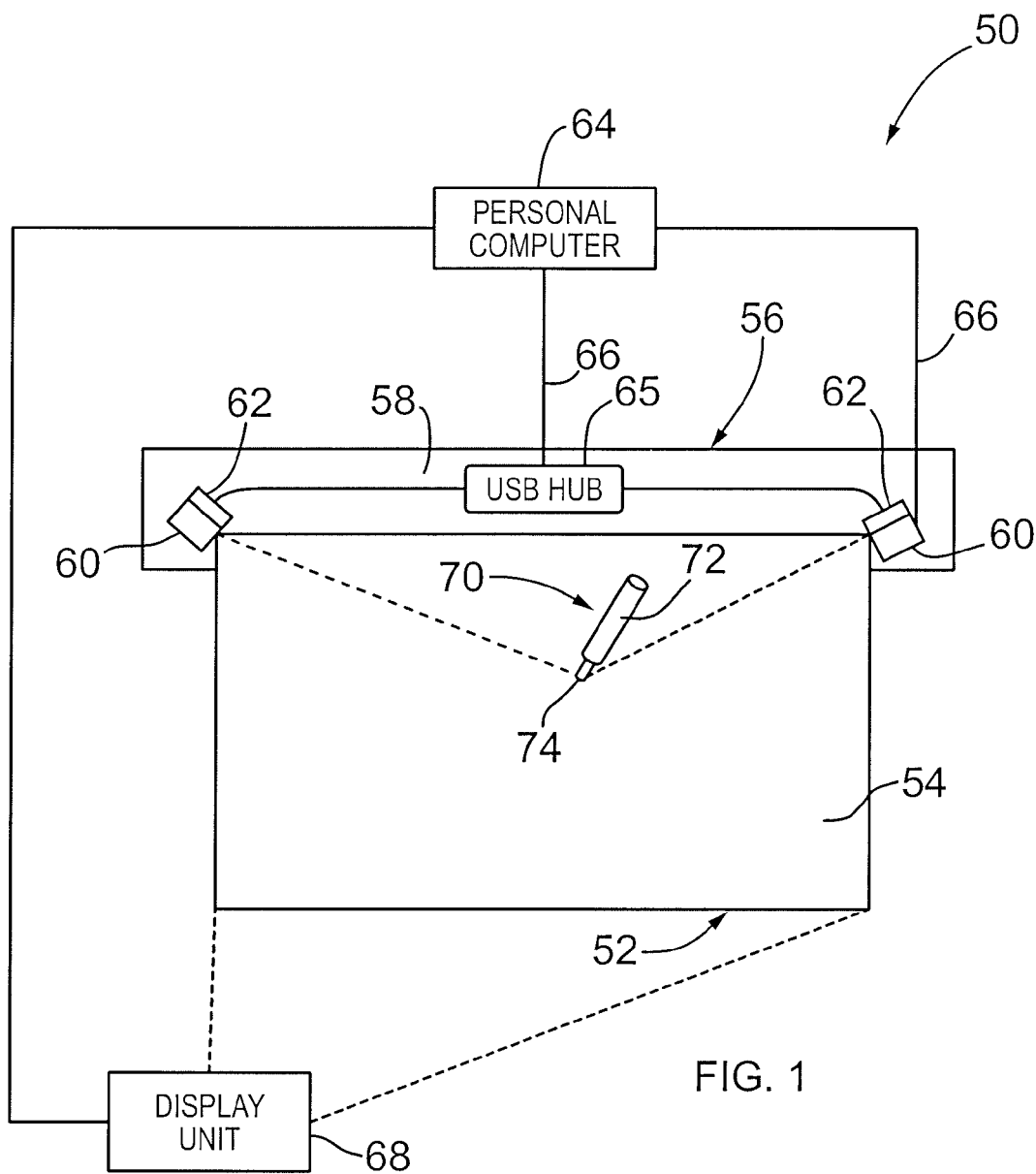
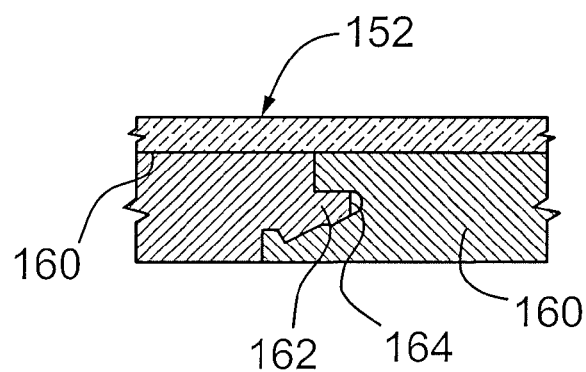
FIG. 1
FIG. 2

TOUCH PANEL AND INTERACTIVE INPUT SYSTEM INCORPORATING THE SAME

FIELD OF THE INVENTION

The present invention relates generally to interactive input systems and in particular to a touch panel and to an interactive touch system incorporating the same.

BACKGROUND OF THE INVENTION

Touch systems are well known in the art and typically include a touch screen or panel having a touch or input surface on which contacts are made using a pointer in order to generate user input. Pointer contacts with the touch surface are detected and are used to generate corresponding output depending on areas of the touch surface where the contacts are made. Many types of touch systems exist that utilize different technologies to identify pointer contacts with the touch surface. These technologies include for example analog resistive, electromagnetic, capacitive, acoustic or machine-vision detection arrangements to identify pointer contacts with the touch surface.

For example, International PCT Application No. PCT/CA01/00980 filed on Jul. 5, 2001 and published under No. WO 02/03316 on Jan. 10, 2002, assigned to SMART Technologies Inc., assignee of the subject application, discloses a camera-based touch system comprising a touch screen that defines a touch surface on which a computer-generated image is presented. Depending on the application, a front or rear projection device may be used to project the image that is visible on the touch surface. A rectangular bezel or frame surrounds the touch surface and supports digital cameras at its corners. The digital cameras have overlapping fields of view that encompass and look across the touch surface from different viewpoints. The digital cameras acquire images looking across the touch surface and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y)-coordinates relative to the touch surface using triangulation. The pointer coordinate data is conveyed to a computer executing one or more applications programs. The computer uses the pointer coordinate data to update the computer-generated image that is presented on the touch surface. Pointer contacts on the touch surface can therefore be recorded as writing or drawing or used to control execution of applications programs executed by the computer.

Interest in machine vision touch systems has increased with the result being a growing demand for such touch systems with larger touch surfaces. In many environments such as in teaching institutions, very large scale touch systems are desired so that visible presentations can be made to large groups. To meet this need, a very large scale touch system has been designed and is described in U.S. patent application Ser. No. 10/750,219 to Hill et al., assigned to SMART Technologies Inc. This very large scale touch system comprises a touch panel having a plurality of input sub-regions that overlap to define a generally contiguous input surface. Each coordinate input sub-region has associated cameras that acquire overlapping images looking across the input sub-region and that generate pointer coordinate data in response to pointer contacts on the input surface. The pointer coordinate data is processed to update image data presented on the input surface. When a pointer contact is made on a portion of a coordinate input sub-region that does not overlap with an adjacent coordinate input sub-region, the coordinate input sub-region processes acquired images to derive pointer data and triangulates the position of the pointer using the derived pointer data thereby to determine the position of the pointer contact relative to the touch surface. When a pointer contact is made on a portion of a coordinate input sub-region that overlaps with an adjacent coordinate input sub-region, each overlapping coordinate input sub-region processes acquired images to derive pointer data and triangulates the position of the pointer using the derived pointer data. The triangulated positions generated by the overlapping coordinate input sub-regions are then processed in accordance with defined logic thereby to determine the position of the pointer contact relative to the touch surface.

In the above-described Hill et al. touch system, as in many touch systems, the touch panel comprises a rigid, one-piece substrate and a low-gloss, dry-erase laminate sheet adhered or otherwise secured to the substrate and defining the input touch surface. As will be appreciated, manufacturing and shipping such a large scale touch panel is expensive. Also, as the demand for even larger touch panels increases, so do the associated manufacturing and shipping costs. As a result, there exists a need for less expensive touch panels.

It is therefore an object of the present invention to provide a novel touch panel and interactive input system incorporating the same.

SUMMARY OF THE INVENTION

Accordingly, in one aspect there is provided a touch panel comprising a substrate having a forward major surface and being formed of a plurality of assembled substrate segments.

In one embodiment, the touch panel further comprises cover material on the forward major surface to reduce the visibility of seams between adjacent substrate segments. The cover material comprises a sheet generally overlying the forward major surface of the substrate. The sheet may be formed of a dry-erase, low-gloss material or other suitable material that is adhered or otherwise secured to the substrate.

In one embodiment, the sheet is adhered to the substrate at selected locations to enable the substrate segments to be moved from an assembled side-by-side arrangement to a stacked arrangement. In the stacked arrangement, the sections of the sheet extending between substrate segments that are not adhered to the substrate segments form living hinges.

In one embodiment, the substrate segments are interlocking and are generally rectangular in plan. Abutting sides of adjacent substrate segments carrying mating formations.

According to another aspect there is provided a kit for a touch panel comprising a plurality of substrate panels, said panels being assembleable in seriatum to form a substrate having a major forward surface.

According to yet another aspect there is provided a touch panel comprising a plurality of side-by-side substrate panels and a cover sheet secured to the substrate panels at selected locations to enable the substrate panels to assume a stacked orientation, sections of the cover sheet extending between adjacent substrate panels forming living hinges.

According to still yet another aspect there is provided an interactive input system comprising a touch panel having an input surface and comprising a substrate formed of a plurality of assembled substrate panels. A detection arrangement detects pointer contacts on the input surface of the touch panel.

In one embodiment, the detection arrangement comprises at least one imaging device. The interactive input system further comprises at least one display unit generating an image that is visible when looking at the input surface and processing structure communicating with the at least one imaging device. The processing structure processes image data captured by the at least one imaging device to detect pointer contacts. The processing structure updates data conveyed to the at least one display unit in accordance with detected pointer contacts.

As will be appreciated, as the substrate is formed of substrate segments or panels that can be easily assembled, the touch panel can be shipped to its installation site in an unassembled, compact state and assembled on-site thereby reducing significantly labour and shipping costs. When the unassembled touch panel arrives at the installation site, the substrate segments or panels can be quickly and easily interconnected and cover material readily applied, if appropriate, thereby to complete assembly of the touch panel.

BRIEF DESCRIPTION OF THE DRAWINGS

Embodiments will now be described more fully with reference to the accompanying drawings in which:

FIG. 1 is a front plan view of an interactive input system comprising an elongate, rectangular touch panel;

FIG. 2 is a side cross-sectional view of a portion of the touch panel shown in FIG. 1;

DETAILED DESCRIPTION OF THE EMBODIMENTS

Figure 3:
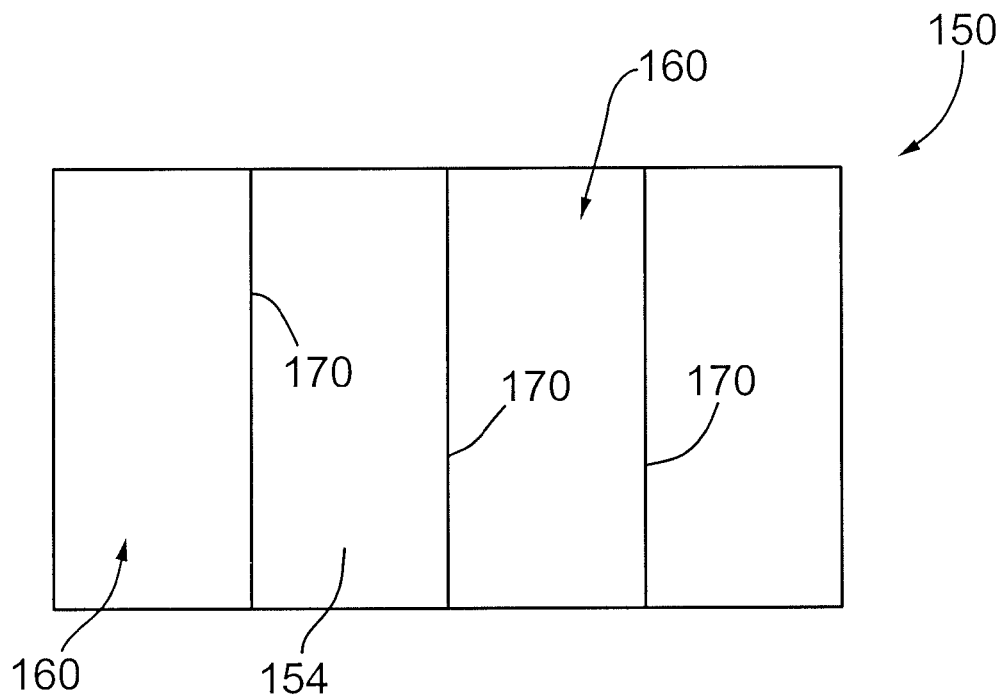
FIG. 3 is a front plan view of a touch panel substrate comprising a plurality of interconnected substrate panels.

Turning now to FIGS. 1 and 2, an interactive input system is shown and is generally identified by reference numeral 50. Interactive input system 50 is similar to that described in U.S. patent application Ser. No. 11/331,448 to Morrison et al. filed on Jan. 13, 2006, the content of which is incorporated herein by reference. As can be seen, interactive input system 50 comprises an elongate, generally rectangular touch panel 52 defining a touch input surface 54. The input surface 54 may extend over the entire forward face of the touch panel 52 or over a portion thereof. A detection assembly 56 extends along one side of the touch panel 52. The detection assembly 56 includes a valence 58 secured to one side edge of the touch panel 52. Digital cameras 60 are positioned adjacent opposite ends of the valance 58. The fields of view of the digital cameras 60 overlap over the entire input surface 54 so that pointer contacts made on the input surface 54 are visually detected by both digital cameras 60.

An infrared (IR) receiver 62 is positioned adjacent to and communicates with an associated digital camera 60. Each IR receiver 62 is similar to those found on consumer electronics and comprises a lensed IR detector coupled to a gain controlled amplifier. The digital cameras 60 are coupled to a computer 64 or other suitable processing device via a universal serial bus (USB) hub 65 and a high speed data bus 66 such as for example USB-2. Computer 64 executes one or more application programs and provides display output to a display unit 68. In this embodiment, the touch panel 52 is opaque and the display unit 68 is a front projection unit that projects an image onto the input surface 54 in response to the display output received from the computer 64. If the touch panel 52 is transparent or translucent, a rear projection unit such as a plasma display, liquid crystal display or other suitable display device can be employed. The touch panel 52, computer 64 and display unit 68 form a closed-loop so that pointer contacts with the input surface 54 can be recorded as writing or drawing or used to control execution of the application programs executed by the computer 64.

Each digital camera 60 in this embodiment includes a two-dimensional CMOS image sensor and associated lens assembly and an on-board processing device such as a digital signal processor (DSP). Of course other suitable image sensors such as for example charge coupled devices (CCDs) can be employed.

In this embodiment, an active pointer 70 is used to interact with the input surface 54. The active pointer 70 includes a pointer body 72 having a tip 74 at one end designed to be brought into contact with the input surface 54. The tip of the pointer 70 illuminates when the pointer is brought into contact with input surface 54. Thus, as the digital cameras 60 capture images looking generally across the input surface 54, the illuminated pointer tip 74 appears as a bright point of illumination against a dark background.

During operation of the interactive input system 50, images captured by each camera 60 are processed on-board to determine if a pointer exists in the captured images. If a pointer exists in an image captured by the camera, pointer characteristic data is generated by the camera and is conveyed to the computer 64. When the computer 64 receives pointer characteristic data from both cameras 60, the computer 64 triangulates the pointer characteristic data to calculate the position of the pointer in (x,y)-coordinates in a manner similar to that described in U.S. Pat. No. 6,954,197 to Morrison et al., the content of which is incorporated herein by reference. As a result, a bounding box surrounding the pointer contact is determined allowing the location of the pointer in (x,y)-coordinates to be calculated. The computer 64 in turn records the pointer coordinate data as writing or drawing if the pointer contact is a write event or injects the pointer coordinate data into the active application program being run by the computer 64 if the pointer contact is a mouse event. To determine if a pointer contact is a write or mouse event, the point of first contact between the pointer 70 and input surface 54 is examined. If the pointer contact is within a designated writing area of the image visible on the input surface 54, the pointer contact is treated as a write event; otherwise the pointer contact is treated as a mouse event.

Turning now to FIGS. 2 and 3, the touch panel 52 is better illustrated. As can be seen, the touch panel 52 comprises a rigid, generally rectangular substrate 150 and a low gloss, dry-erase laminate cover sheet 152 adhered to the forward major face 154 of the substrate 150 and defining the input surface 54. In this embodiment, the substrate 150 comprises a plurality of rectangular, interconnected substrate panels 160 in seriatum that are formed of a resin-based, fibrous composite material, although plastic, wood, metal or other suitable material may be used. Abutting sides of adjacent substrate panels 160 carry mating formations allowing the substrate panels 160 to interlock. In this embodiment, the mating formations are in the form of tongues 162 and grooves 164 (see FIG. 4). As the cover sheet 152 overlies the forward major surface 154 of the substrate 150, the seams 170 between adjacent substrate panels 160 are covered and are thus, obscured from view so as not to be seen by the cameras 60.

To reduce manufacturing and shipping costs, the substrate panels 160 and laminate cover sheet 152 are shipped to the installation site in kit form, unassembled. The kit comprises the requisite number of interlocking substrate panels 160 needed to construct the touch panel 52 of the desired size and a continuous laminate cover sheet 152 generally sized to overlie the major forward face 154 of the substrate 150 once the substrate panels 160 have been assembled. In this embodiment, the laminate cover sheet 152 has an adhesive layer thereon protected by a removeable release layer.

Figure 4:
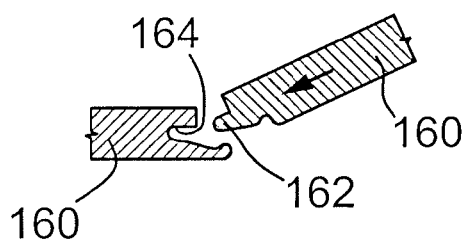
FIG. 4 are side views showing assembly of two substrate panels forming the touch panel of FIG. 2.
Figure 4:
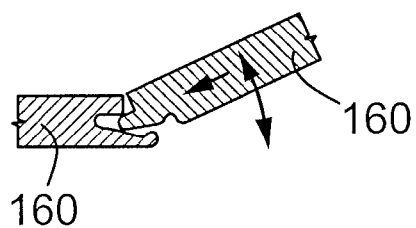
Figure 4:
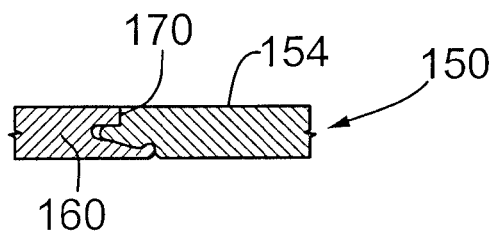

In order to assemble the touch panel 52, the requisite substrate panels 160 are interconnected by joining the tongues 162 and grooves 164 of adjacent substrate panels in the manner shown in FIG. 4 thereby to complete assembly of the substrate 150. Once the substrate 150 has been assembled, the laminate cover sheet 152 is adhered to the major forward face 154 of the substrate 150 by removing the release layer from the adhesive surface of the laminate cover sheet 152 and laying the laminate cover sheet 152 over the major forward face 154. With the touch panel 52 assembled, the valence 58 can then be affixed to the touch panel and the touch panel can be secured or otherwise attached to a wall surface.

If desired, a laminate cover sheet 152 that is larger than the substrate 150 can be included in the kit. In this case, during assembly, the edges of the laminate cover sheet 152 that extend beyond the periphery of the substrate can either be folded under the substrate 150 or the laminate cover sheet 152 can be trimmed to fit the substrate.

Although the above embodiment describes use of a laminate cover sheet 152 disposed on the assembled substrate panels 160, those of skill in the art will appreciate that alternative methods to reduce visibility of the seams 170 between adjacent substrate panels may be employed. For example, paint or caulking can be applied to the substrate 150 to cover and/or fill in the seams 170 after the substrate panels 160 have been assembled. Alternatively, the proximate edges of adjacent substrate panels 160 may be finely machined to virtually eliminate the visual perceptibility of the seams 170.

Figure 5:
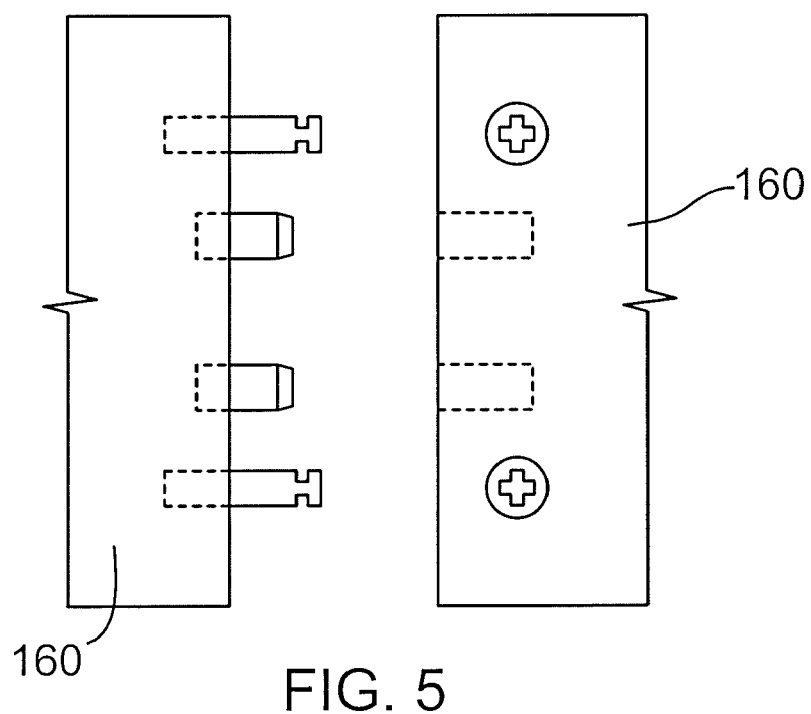
FIG. 5 is a front plan view of alternative substrate panels.
Figure 6A:
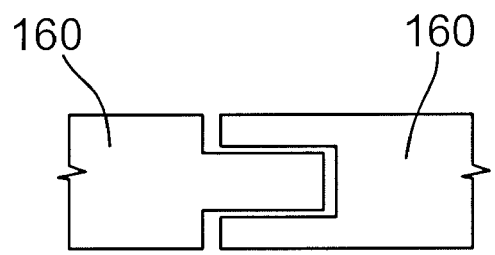
FIGS. 6a and 6b are side views of additional alternative substrate panels.
Figure 6B:
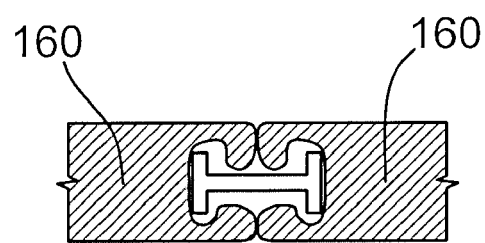

Although the substrate panels 160 are described as carrying mating formations in the form of tongues 162 and grooves 164, those of skill in the art will appreciate that the substrate panels 160 may carry formations of other configurations. For example, FIGS. 5, 6a and 6b show but a few alternative mating formations provided on adjacent substrate panels 160. Rather than using mating formations to interlock adjacent substrate panels 160, clips, clamps, brackets, adhesive, fasteners or other suitable techniques may be used to secure adjacent substrate panels to one another.

Figure 7A:
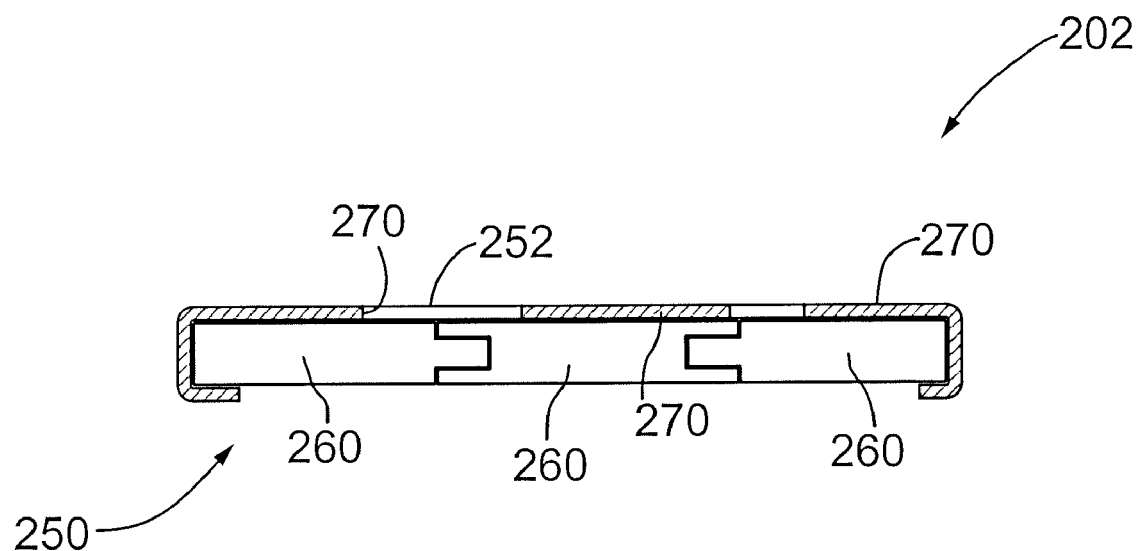
FIGS. 7a and 7b are side elevational views of an alternative touch panel in assembled and collapsed conditions
Figure 7B:
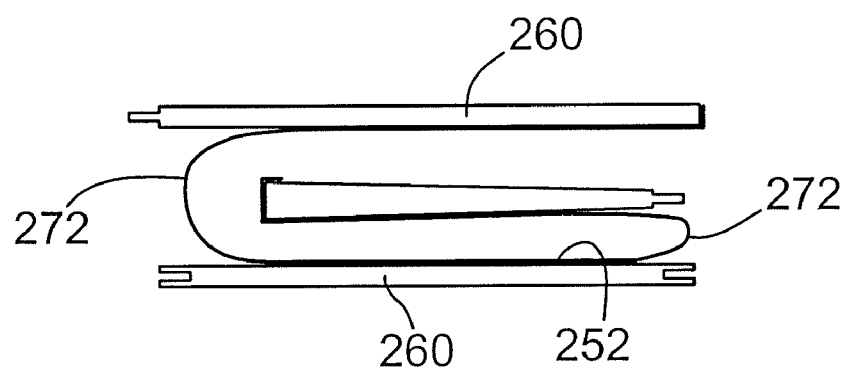

Turning now to FIGS. 7a and 7b, an alternative touch panel is shown and is generally identified by reference numeral 202. Similar to the previous embodiment, the touch panel 202 comprises a substrate 250 formed of a plurality of interlocked substrate panels 260 in seriatum. Adjacent substrate panels 260 carry mating formations. A cover sheet 252 overlies the major forward face of the substrate 250. The cover sheet 252 in this embodiment is secured to the substrate panels 260 by adhesive 270 placed at selected locations to enable the substrate panels to assume the stacked, collapsed condition of FIG. 7b when the touch panel 202 is to be shipped. As will be appreciated, the sections 272 of the cover sheet 252 that are not adhered to substrate panels 260 form living hinges.

Although the touch panel has been described with reference to the interactive input system 50 shown in FIG. 1, those of skill in the art will appreciate that the touch panel 52 may be used in a variety of interactive environments. For example, the touch panel 52 is also very suitable for use in other machine vision touch systems such as those disclosed in aforementioned U.S. Pat. No. 6,972,401 and U.S. patent application Ser. No. 10/750,219 to Hill et al, the contents of which are incorporated herein by reference. Of course, the touch panel is not limited to use in machine vision touch systems. The touch panel can also be used in interactive input systems employing ultrasonic, electromagnetic or other non-vision sensing systems as well as in analog resistive and capacitive interactive input systems. In these latter cases, as will be appreciated by those of skill in the art, mechanical and electrical connections between adjacent substrate panels are required.

Those of skill in the art will appreciate that the touch panel may be used in still other applications. In particular, the touch panel may be used on its own in a conventional non-interactive touch panel environment. The touch panel may also be used in other systems such as that disclosed in U.S. patent application Ser. No. 09/876,230 to Keenan et al., the content of which is incorporated herein by reference.

Although embodiments have been described with reference to the figures, those of skill in the art will appreciate that variations and modifications may be made without departing from the spirit and scope thereof as defined by the appended claims.

What is claimed is:

1. A touch panel comprising a rigid substrate having a forward major surface and being formed of a plurality of assembled, interconnected non-active substrate segments and a continuous sheet of flexible material directly overlying substantially the entirety of said forward major surface and covering seams between adjacent substrate segments; and a plurality of camera devices, said camera devices having fields of view looking generally across said sheet of flexible material from different viewpoints, wherein said sheet covers and obscures the covered seams from view by said camera devices.

2. A touch panel according to claim 1 wherein said sheet is formed of a dry-erase, low-gloss material.

3. A touch panel according to claim 1 wherein said sheet is adhered to said substrate.

4. A touch panel according to claim 3 said sheet is adhered to said substrate at selected locations to enable the substrate segments to be moved from an assembled side-by-side arrangement to a stacked arrangement whereby said substrate segments are disposed one on top of the other.

5. A touch panel according to claim 1 wherein said substrate segments are interlocking.

6. A touch panel according to claim 5 wherein abutting sides of adjacent substrate segments carry mating formations.

7. A touch panel according to claim 1 wherein each of said substrate segments is generally rectangular in plan.

8. A touch panel according to claim 7 wherein said sheet is formed of a dry-erase, low-gloss material.

9. A touch panel according to claim 7 wherein said sheet is adhered to said substrate.

10. A touch panel according to claim 9 wherein said sheet is adhered to said substrate at selected locations to enable the substrate segments to be moved from an assembled side-by-side arrangement to a stacked arrangement whereby said substrate segments are disposed one on top of the other.

11. A kit for a touch panel comprising a plurality of non-active, rigid substrate panels, said panels being assembleable in seriatum to form a substrate having a major forward surface; a continuous sheet of flexible material positionable to overlie substantially the entirety of said forward major surface and cover seams between adjacent substrate panels when said substrate panels are assembled and interconnected to form said substrate; and a valance securable to one side of said substrate when said substrate panels are assembled and interconnected, said valance accommodating a camera device adjacent each end thereof, wherein said sheet obscures the covered seams from view by each camera device when positioned to overlie directly said forward major surface.

12. A kit according to claim 11 wherein said sheet is formed of a dry-erase, low-gloss material.

13. A kit according to claim 11 wherein said sheet comprises an adhesive layer on one surface thereof and a release layer disposed on said adhesive layer.

14. A kit according to claim 11 wherein said substrate panels are interlocking.

15. A kit according to claim 14 wherein said substrate panels carry mating formations.

16. A kit according to claim 11 wherein each of said substrate panels is generally rectangular in plan.

17. A touch panel comprising:
a plurality of side-by-side non-active substrate panels defining a rigid substrate having a major forward surface, adjacent substrate panels being releasably interconnected;
a flexible cover sheet overlying substantially the entirety of said major forward surface and being secured directly to said substrate panels at selected locations, said substrate panels being disconnectable and rearrangeable to assume a stacked orientation whereby said substrate panels are disposed one on top of the other without unsecuring said cover sheet from said substrate panels; and
a plurality of camera devices, each camera device being positioned adjacent a respective corner of said substrate and having a field of view looking generally across said flexible cover sheet, wherein said cover sheet obscures covered seams between adjacent substrate panels from view by said camera devices.

18. A touch panel according to claim 17 wherein said cover sheet is adhered to said substrate panels at said selected locations.

19. A touch panel according to claim 18 wherein said sheet is formed of a dry-erase, low-gloss material.

20. A touch panel according to claim 18 wherein said substrate panels are interlocking.

21. A touch panel according to claim 18 wherein abutting sides of adjacent substrate panels carry mating formations.

22. An interactive input system comprising:
a touch panel comprising a rigid substrate formed of a plurality of non-active assembled substrate panels and defining a major forward surface and a continuous sheet of flexible material directly overlying substantially the entirety of said forward major surface and covering seams between adjacent assembled substrate panels; and
a detection arrangement detecting pointer contacts on the sheet, wherein said detection arrangement comprises imaging devices with each imaging device being positioned adjacent a different corner of said touch panel and having a field of view looking generally across said sheet, wherein said sheet obscures the covered seams from view by the imaging devices.

23. An interactive input system according to claim 22, further comprising at least one display unit generating an image that is visible when looking at the sheet.

24. An interactive input system according to claim 23, further comprising processing structure communicating with said imaging devices, said processing structure processing image data captured by said imaging devices to detect pointer contacts on said sheet.

25. An interactive input system according to claim 24, wherein said processing structure updates data conveyed to said display unit in accordance with detected pointer contacts.

26. An interactive input system according to claim 22, wherein said sheet is formed of a dry-erase, low-gloss material.

27. An interactive input system according to claim 22, wherein said sheet is adhered to said substrate.

28. An interactive input system according to claim 22, wherein said substrate panels are interlocking.

29. An interactive input system according to claim 28, wherein adjacent substrate panels carry mating formations.

30. An interactive input system according to claim 22, wherein each of said substrate panels is generally rectangular in plan.

* * * * *